Nov. 5, 1968  F. D. McLEOD, JR  3,409,838
DEMODULATOR FOR FREQUENCY MODULATED WAVES
Filed Oct. 23, 1965
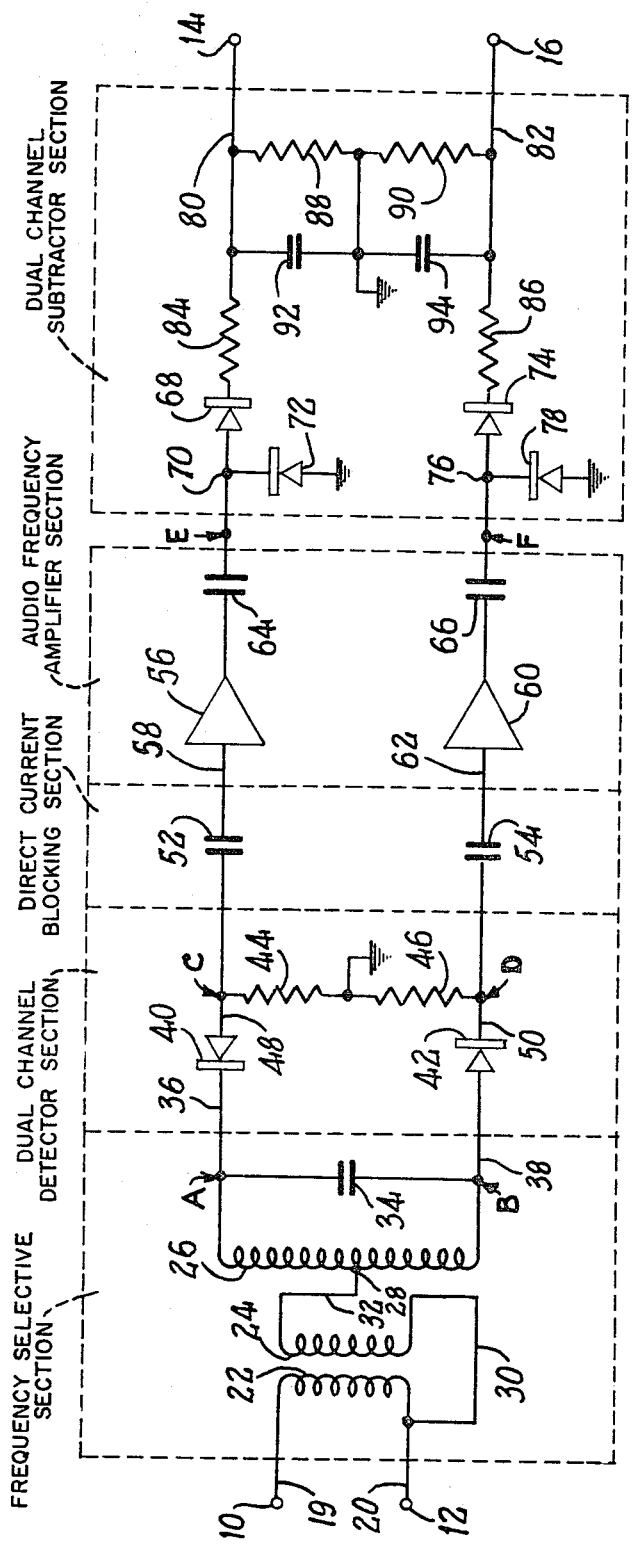
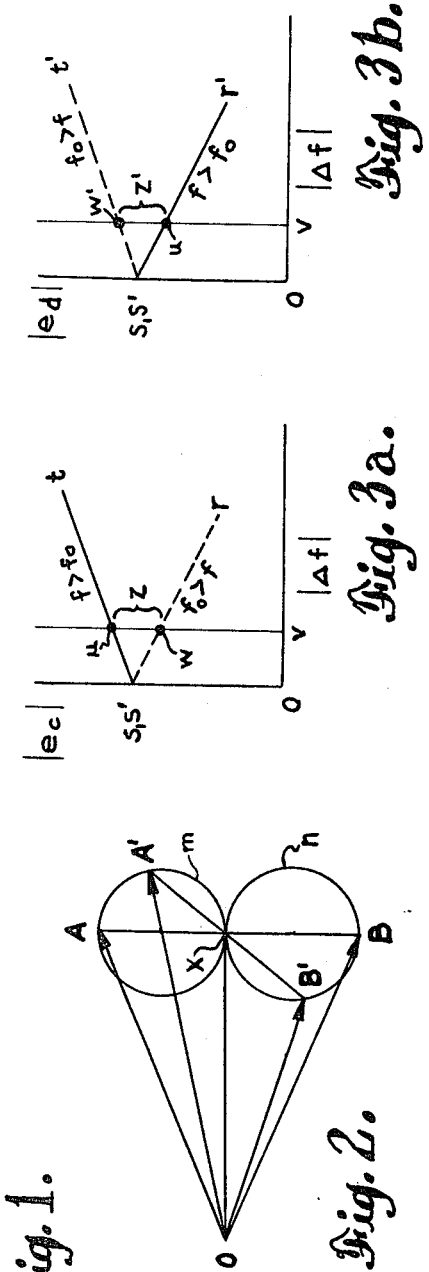
Fig. 1.
Fig. 2.
Fig. 3a.
Fig. 3b.
INVENTOR
FRANCIS D. MC LEOD, JR.
BY Bernard Olcott
ATTORNEY

United States Patent Office 3,409,838
Patented Nov. 5, 1968

3,409,838
DEMODULATOR FOR FREQUENCY MODULATED WAVES
Francis D. McLeod, Jr., Scotia, N.Y., assignor to Mennen-Greatbatch Electronics, Inc., Clarence, N.Y., a corporation of New York
Filed Oct. 23, 1965, Ser. No. 504,006
11 Claims. (Cl. 329—137)

ABSTRACT OF THE DISCLOSURE

A demodulator for frequency shifted signals comprising: (A) a frequency selected circuit tuned to the input carrier signal and having two output channels providing a signal in each channel having an amplitude which changes from a selected magnitude in opposite polarity sense from the signal in the other channel as a function of the extent of the frequency shift of the Doppler signal component of the input signal from the carrier signal; (B) a dual channel detector coupled to the dual output of the frequency selected circuit of (A) providing an audio frequency signal in each channel having an amplitude corresponding to the Doppler shift which changes in opposite polarity sense from the signal in the other channel and also for rectifying the carrier signal to a D.C. voltage; (C) a circuit in each channel for removing the carrier rectified D.C. voltage output from (B); and (D) differential dual channel circuits coupled to (C) for subtracting the input signals thereto so as to provide an output therefrom which varies in magnitude and sense directly with frequency shift of the Doppler signal from the carrier as applied to the input side of (A).

---

This invention relates to frequency modulation detection systems and in particular, to a new type of frequency modulation demodulator.

While my invention can be employed generally in electronic FM systems and circuits, one outstanding application is in equipment employing Doppler techniques for measuring velocity. Another noteworthy application is for single sideband receiving equipment, either data or communication.

When a reflector is moving randomly in the field of a sonic, ultrasonic or electromagnetic radiator, reflected waves return to the source with a frequency different from that of the transmitted frequency. The frequency difference is known as Doppler shift and is proportional to the radial velocity of the reflector, relative to the source. Modulation of radial velocity produces frequency modulation (or more correctly, phase modulation) of the Doppler component. Classically, the presence of the Doppler component can be detected by mixing the reflected wave with a portion of the transmitted wave and passing both through a simple diode demodulator. The Doppler signal will then be recovered but without any identification as to whether it is an upper or a lower sideband. This means that it is not possible to know whether the reflector has radial velocity towards the source, or away from it.

This "sense" of the Doppler signal can be preserved if the demodulator is a discriminator of either Foster-Seeley or Ratio Detector types. However, the unavoidable presence of a large carrier component mixed with the small Doppler component puts both of these classic discriminators at a severe operational disadvantage.

The Foster-Seeley discriminator depends on direct subtraction of the absolute magnitudes of two vectors. It exhibits a "capture" effect which makes it lock onto the strongest signal present. The presence in the discriminator output of a single weak sideband, which may be only one part in one million relative to the carrier amplitude is difficult to determine and more difficult to measure unless fantastic carrier and discriminator stabilities are maintained. Attenuating the carrier with a notch type filter to reduce this ratio is of some help, but here again, extraordinary stability must be maintained on the carrier and on the notch frequency. Also, use of the notch filter severely attenuates sideband channels close to the carrier which means that low flow rates will not be detectable.

The Ratio Detector bears a superficial similarity to my invention in that both circuits use a tuned filter and both use reversed diodes. The similarity stops here however, since the Ratio Detector relies for its operation on maintaining an unchanging voltage across its output. In practice, this voltage is held constant with a battery or a large capacitor. My invention not only avoids such circuit elements, but actually develops two separate audio voltages at this point whose difference in absolute magnitude contains the desired signal information.

The Ratio Detector suffers from the same problem as the Foster-Seeley discriminator regarding the presence of a strong carrier which masks the weak sideband. Again, fantastic and impractical stabilities of carrier and tuned circuits must be maintained to insure detection of the sideband.

In summary, my invention relies on a different operating principle than does the Foster-Seeley discriminator or the Ratio Detector and achieves results unobtainable with either of these classic types.

A broad object of this invention is to provide a new type of FM single sideband discriminator.

Another object of this invention is to provide a new discriminator which translates the carrier frequency to a signal of the type that can be conveniently removed or discarded and thereafter have remaining only the frequency modulated intelligence.

Yet another object of this invention is to provide a new discriminator uniquely adapted to deteeing the presence of a small Doppler component in a strong carrier. This situation is characteristic of signals in undersea sonar, or Doppler radar equipments.

In accordance with my invention there is provided a frequency detection system which comprises: a frequency selective circuit couplable to an input carrier signal and an input Doppler signal which is frequency shifted from the carrier signal, such frequency selective circuit being tuned to the inupt carrier signal and having dual output channels providing a signal in each channel having an amplitude which changes from a selected magnitude in opposite polarity sense from the signal in the other channel as a function of the extent of the frequency shift of the Doppler signal from the carrier signal; a dual channel detector coupled to the dual outputs of said frequency selective circuit for providing an audio frequency signal in each channel having an amplitude corresponding to the Doppler shift which changes in opposite polarity sense from the signal in the other channel and also for rectifying the carrier signal to a D.C. voltage; means in each channel for removing the carrier rectified D.C. voltage; and differential dual channel means coupled to the D.C. voltage removal means for subtracting the input signals thereto so as to provide an output which varies in magnitude and sense directly with frequency shift of the Doppler signal from the carrier.

Other objects and features of the present invention will be set forth or apparent in the following description and claims and illustrated in the accompanying drawing which disclose by way of example and not by way of limitations, in a limited number of embodiments, the principle of the invention and circuit implementations of the inventive concept.

In the drawing, in which like reference numbers designate like components in the several views:

FIG. 1 is a schematic diagram of an FM demodulator according to the invention;

FIG. 2 is a vector diagram illustrating voltage relationships in the Frequency Selective portion of the schematic diagram in FIG. 1; and FIGS. 3a and 3b are diagrams illustrating the voltage relationships at the output side of the Dual Channel Detector portion of the schematic diagram of FIG. 1.

In FIG. 1, there is impressed upon input terminals 10 and 12 a radio frequency signal comprising a carrier signal and at least one Doppler signal which is frequency shifted from said carrier signal according to the velocity, variable or fixed, of a surface or body which is reflecting back the radiated carrier signal. Generally, the Doppler signal is much weaker than the carrier signal. At the output side of the detection system of FIG. 1, a signal is generated upon output terminals 14 and 16 which corresponds to the frequency shift of the input Doppler signal and thereby the instantaneous velocity of the reflecting surface. When there are a plurality of input Doppler signals as generated by a plurality of reflecting surfaces each moving at a different speed, circuitry can optionally be incorporated in the system to provide an output signal upon terminals 14 and 16 which represent an instantaneous selective average, such as the root-mean-square, velocity of all the moving reflecting surfaces.

Input terminals 10 and 12 are connected by leads 19 and 20 to a dual channel output Frequency Selector section FS which in one embodiment includes inductors 22, 24 and 26, inductor 22 being connected to leads 19 and 20, respectively. Inductors 22, 24 and 26 are disposed in mutual inductive relationship with their helix axes parallel to each other and inductor 26 has a center tap 28. Inductor 24 is connected to the input terminal 12 and center tap 28 by leads 30 and 32, respectively. Inductor 26 is positioned at the output end of the frequency selector FS and is tuned by a capacitor 34 to the carrier frequency component (which corresponds to the outwardly transmitted radiation signal) impressed upon input terminals 10 and 12.

The signals appearing at each of the dual channel output sides of the frequency selector FS are impressed upon a Dual Channel First Detector section DCD by leads 36 and 38 connected respectively to the parallel combination of capacitor 34 and inductor 26. The components of FS are selectively adjusted to modify the input signal impressed upon terminals 10 and 12 in the manner shown in FIG. 2 so that the signal appearing at points A (lead 36) and B (lead 38) when the reflecting body is motionless (the reflecting wave then has only the carrier component) can be represented as equal length phase displaced vectors A and B from a common origin O, the ends of vectors A and B being located upon a pair of tangent circles $m$ and $n$ and the vector representing the difference between vector A and B passing through the point of tangency.

FS acts as a dual channel frequency selective filter, having sloping response curves which are respectively positive and negative in each of the two channels. The filter output at A, as shown in FIG. 2, consists of two components. An inphase component OX is inductively coupled from the primary 22 to one secondary 24 and then directly conducted to the center-tap of the other secondary 26. A quadrature component XA is inductively coupled from the primary 22 to the tuned secondary 26, resulting in a 90° phase shift when operating precisely on the tuned resonant frequency. The voltage at A, which is vector OA, is the vector sum of components OX and XA. Similarly, the voltage at B, which is vector OB, is the vector sum of components OX and XB.

When the reflecting body is moving, the reflected return wave as modified by the frequency selector section FS according to the invention can be represented by the vectors OA' and OB' which have shifted from the A and B positions but have maintained their vector ends on the concentric circles $m$ and $n$, the difference vector A'B' passing through the point of tangency X as before. Hence, it can be seen that the magnitude of the signal on one of the leads 36 or 38 increases as the Doppler frequency increases while the magnitude of the signal on the other lead decreases as the Doppler frequency increases. While circuitry to provide the vector relationship of FIG. 2 is shown in FIG. 1 as consisting of three inductors and one capacitor, it is to be understood that this invention embraces other combinations of circuit elements of inductors and capacitors so long as they provide the vector relationship illustrated in FIG. 2.

The Dual Channel Detector DCD receives the dual channel signals on leads 36 and 38 and comprises a pair of oppositely poled rectifiers 40 and 42, the cathode of rectifier 40 being shown connected to lead 36 while the anode of rectifier 42 being shown connected to lead 38. At the output side of the Dual Channel Detector, a pair of series connected resistors 44, 46 are connected across the output sides of rectifiers 40 and 42 by leads 48 and 50, respectively, the common junction of resistors 44 and 46 being grounded.

The Duel Channel Detector mixes the carrier frequency and the Doppler signal or signals and detects the modulation products to provide audio frequency signals of opposite polarity in its two channels. Referring to FIG. 2, one of the audio frequency signals has an absolute magnitude corresponding to the length of the vector OA' and the other channel audio frequency signal has an absolute magnitude corresponding to the length of the vector OB'.

The resulting modulation by-products of DCD include an audio signal whose magnitude is proportional to the magnitude of the RF sideband voltage applied to the DCD and whose frequency is equal to the difference between the carrier frequency and the sideband frequency. Thus as the RF sideband frequency increases, the magnitude of the audio voltage at point C on lead 48 increases while the magnitude of the audio voltage at point D on lead 50 decreases. The converse prevails when the RF sideband frequency decreases. This relationship is shown in FIGS. 3a and 3b where $f$ is the Doppler frequency, $f_o$ is the center or carrier frequency and $|\Delta f|$ is the absolute value of the Doppler shift and $e_c$ and $e_d$ are the audio Doppler detection product voltages at points C and D.

When the reflecting body is moving towards the receiving antenna, $f > f_o$ and the magnitude of the voltage at point C decreases along line $t$ to $s$ as the velocity decreases. At the same time, the voltage at point D increases along line $r'$ to $s'$. Also, when the reflecting body is moving away from the receiving antenna, $f < f_o$ and the voltage at point C increases along line $r$ to $s$ as the velocity is decreased and the voltage at point D decreases along line $t'$ to $s'$. Since the relationships shown in FIGS. 3a and 3b take the graphic form of the letter "K," this invention will be referred to as a "K Detector."

The modulation product voltages $e_c$ and $e_d$ vary at audio frequencies for Doppler sidebands well away from the carrier, but decrease in frequency for Doppler sidebands close to the carrier and finally become D.C. for the carrier itself. Along with such frequency relationships, the Doppler signal intelligence is present as A.C. voltage magnitudes at points C and D while the carrier is rectified to a D.C. voltage. The carrier-to-D.C. conversion is very convenient because the carrier is usually very much stronger than the Doppler signals and in prior art systems, weak Doppler signals often become obliterated.

Since the original carrier frequency is converted by the Dual Channel Detector to a D.C. signal, the original carrier component is removed by a Direct Current Blocking section DCB which can simply consist of a pair of series connected capacitors 52, 54, one in each of the channel leads 48, 50. As shown in FIG. 1, there is provided an audio frequency amplifier section AMP at the output side of section DCB which blocks out very low frequencies in the region of D.C. and thereby the curves in FIGS. 3a and 3b become discontinuous near s and s'. In FIG. 1, the input of an amplifier 56 is connected by a lead 58 to the output side of capacitor 52, an amplifier 60 is connected at its input side to the output side of capacitor 54 by a lead 62, and a pair of capacitors 64, 66 are connected in series with the output sides of amplifiers 56 and 60, respectively.

Capacitors 52, 54, 64, 66 and audio amplifiers 56, 60 maintain in each channel the circuit response shown in FIGS. 3a and 3b and the voltages appearing at points E and F at the output sides of capacitors 64 and 66 follow those shown for points C and D in FIGS. 3a and 3b.

For any discrete approaching target velocity such as $v$, the voltages of E and F are the ordinates $u$ and $u'$ in FIGS. 3a and 3b. When the target is retreating at the same velocity $v$, the voltage of E and F are the ordinates $w$ and $w'$. Hence, the velocity $v$ can be measured by subtracting voltages at E and F and for this purpose, a dual channel subtractor DCS is provided in FIG. 1. Such DCS can be of conventional design to provide on terminals 14, 16 a single voltage $z$ and $z'$ whose magnitude and polarity will be indicative of the velocity of the target and whether it is advancing or retreating. When there are a plurality of targets moving at different speeds, it may be convenient to indicate the root-mean-square (R.M.S.) on terminals 14 and 16 of all the target movements. For this reason, one embodiment of an R.M.S. dual channel differential circuit is detailed in section DCS of FIG. 1.

In the first channel of DCS, there is provided a rectifier 68 having its anode connected to the output side of capacitor 64 by a lead 70 and to ground through the cathode of a rectifier 72. In the other channel, a rectifier 74 has its anode side connected to the output side of capacitor 66 by a lead 76 and through the cathode side of a rectifier 78 to ground. The cathode sides of rectifiers 68 and 74 are connected to their respective channel output leads 80 and 82 through series resistors 84 and 86. Lead 80 is connected to ground through a resistor 88 shunted by a capacitor 92 while lead 82 is connected to ground through a resistor 90 shunted by a capacitor 94. Parameters are adjusted to provide an R.M.S. output on terminals 14, 16.

It is to be understood that conventional R.M.S. circuits and devices can replace the above detailed dual channel differential circuit DCS. For instance, the voltages at points E and F can be converted to heat which is then measured by thermocouples and subtracted to provide a differential R.M.S. output.

This invention can advantageously be employed for the measurement of fluid flow in a stream wherein radiation reflecting particles in the stream provide a large plurality of Doppler signals.

Normally, a flow profile in a pipe or conduit contains flow streams of varied velocities, ranging from zero near its wall to a maximum at the center line of the pipe. These varied flows produce a broad spectrum of Doppler frequencies whose outputs should be desirable combined in some manner to represent total flow. It is the power contained in each component that should be added and this can be accomplished electrically by taking the root of the mean of the squares of the amplitudes of the components (R.M.S.). The system shown in FIG. 1 is particularly useful for determining and monitoring the flow in a pipe or conduit.

The K detection system can also advantageously be employed as an FM discriminator in communication receivers and similiar equipment in single sideband frequency modulated systems. In such applications, a dual channel differential circuit DCS is used to respond directly to the voltage variations at E and F.

What I claim is:

1. A frequency detection system which comprises: a frequency selective circuit couplable to an input carrier signal and an input Doppler signal which is frequency shifted from said carrier signal, said frequency selective circuit being tuned to said input carrier signal and having dual output channels providing a signal in each channel having an amplitude which changes from a selected magnitude in opposite polarity sense from the signal in the other channel as a function of the extent of the frequency shift of said Doppler signal from said carrier signal; a dual channel detector coupled to the dual outputs of said frequency selective circuit for providing an audio frequency signal in each channel having an amplitude corresponding to said Doppler shift which changes in opposite polarity sense from the signal in the other channel and also for rectifying said carrier signal to a D.C. voltage; means in each channel for removing the carrier rectified D.C. voltage; and differential dual channel means coupled to said D.C. voltage removal means for subtracting the input signals thereto so as to provide an output which varies in magnitude and sense directly with frequency shift of said Doppler signal from said carrier.

2. A frequency detection system according to claim 1 including an audio amplifier in each channel coupled between the D.C. signal removing means and said differential dual channel means.

3. A frequency detection system according to claim 1 wherein said dual channel detector includes oppositely poled rectifiers in each channel.

4. A frequency detection system according to claim 1 wherein said differential dual channel means extracts the square root of the square of the signals in each channel prior to the subtracting operation.

5. A frequency detection system according to claim 4 wherein differential dual channel means includes in each channel, a series and shunt rectifier, a first resistor at the output side of said series rectifier in series with a parallel combination of a second resistor and a capacitor, the circuit parameters being adjusted to yield the root-mean-square of a plurality of input signals thereto.

6. A frequency detection system according to claim 5 wherein the series and shunt rectifiers in each channel are oppositely poled and the corresponding rectifiers in the two channels are similarly poled.

7. A frequency detection system according to claim 1 wherein said frequency selective means includes a first and second inductor, a third inductor having a center tap, the three inductors being positioned in mutual inductive relationship with their axes in parallel relationship, one end of said first inductor being connected to one end of said second inductor, the other end of said second inductor being connected to the center tap of said third inductor, and a capacitor connected across said third inductor, said third inductor and said capacitor being tuned substantially to the carrier signal frequency.

8. A frequency detection system according to claim 1 wherein said frequency selective means provides a first and second voltage responsive to the input carrier signal and a third and fourth voltage responsive to the Doppler input signal shifted from said carrier signal, the pair of said first and second voltages and the pair of said third and fourth voltages being representable by vectors having a common origin, the vector representing the difference between the two voltages in each of said pairs of voltage vectors having its ends located on a pair of tangent circles and passing through the point of tangency of the circles.

9. A frequency detection system according to claim 8 wherein said first and second voltages are represented by vectors of substantially equal length.

10. A frequency detection system according to claim 1 wherein said carrier removing means includes at least one series capacitor in each channel.

11. A frequency detection system according to claim 3 wherein said dual channel detector includes a pair of resistors connected between the channels, the connection point between such resistors being grounded.

References Cited

UNITED STATES PATENTS

| 2,756,336 | 7/1956 | Christensen | 325—320 X |
| 3,063,019 | 11/1962 | De Waard et al. | 329—129 |
| 3,290,608 | 12/1966 | Gschwandtner | 329—129 X |

ALFRED L. BRODY, *Primary Examiner.*